(12) United States Patent
Fornage

(10) Patent No.: US 8,035,257 B2
(45) Date of Patent: *Oct. 11, 2011

(54) METHOD AND APPARATUS FOR IMPROVED BURST MODE DURING POWER CONVERSION

(75) Inventor: Martin Fornage, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/804,943

(22) Filed: Aug. 2, 2010

(65) Prior Publication Data

US 2010/0309695 A1 Dec. 9, 2010

Related U.S. Application Data

(63) Continuation of application No. 12/249,533, filed on Oct. 10, 2008, now Pat. No. 7,768,155.

(51) Int. Cl.
H01H 9/54 (2006.01)

(52) U.S. Cl. .......................................................... 307/140

(58) Field of Classification Search .................... 307/140
See application file for complete search history.

(56) References Cited

U.S. PATENT DOCUMENTS

| | | | |
|---|---|---|---|
| 4,375,662 A | 3/1983 | Baker | |
| 4,404,472 A | 9/1983 | Steigerwald | |
| 4,649,334 A | 3/1987 | Nakajima | |
| 5,604,430 A | 2/1997 | Decker et al. | |
| 6,351,400 B1 | 2/2002 | Lumsden | |
| 6,678,176 B2 | 1/2004 | Lumsden | |
| 6,809,942 B2 | 10/2004 | Madenokouji et al. | |
| 6,844,739 B2 | 1/2005 | Kasai et al. | |
| 6,919,714 B2 | 7/2005 | Delepaut | |
| 6,984,970 B2 | 1/2006 | Capel | |
| 7,053,506 B2 | 5/2006 | Alonso et al. | |
| 7,091,707 B2 | 8/2006 | Cutler | |
| 7,158,395 B2 | 1/2007 | Deng et al. | |
| 7,420,354 B2 | 9/2008 | Cutler | |
| 7,432,691 B2 | 10/2008 | Cutler | |
| 7,479,774 B2 | 1/2009 | Wai et al. | |
| 7,768,155 B2 * | 8/2010 | Fornage | 307/140 |
| 2004/0207366 A1 | 10/2004 | Sung | |
| 2004/0264225 A1 | 12/2004 | Bhavaraju et al. | |
| 2005/0254191 A1 | 11/2005 | Bashaw et al. | |
| 2007/0159866 A1 | 7/2007 | Siri | |
| 2007/0221267 A1 | 9/2007 | Fornage | |
| 2008/0111517 A1 | 5/2008 | Pfeifer et al. | |
| 2008/0143188 A1 | 6/2008 | Adest et al. | |
| 2008/0183338 A1 | 7/2008 | Kimball et al. | |
| 2008/0290252 A1 | 11/2008 | Leonhardt et al. | |

OTHER PUBLICATIONS

International Search Report and Written Opinion mailed May 26, 2010 for PCT Application No. PCT/US2009/060148.
"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

(Continued)

Primary Examiner — Robert L. Deberadinis
(74) Attorney, Agent, or Firm — Moser Taboada

(57) ABSTRACT

A method and apparatus for coupling power to an AC power grid. In one embodiment, the method comprises interleaving a storage period and a burst period, wherein (i) energy is stored during the storage period for a predetermined number of grid voltage cycles, and (ii) stored energy is converted to AC power and coupled to the AC power grid during the burst period.

20 Claims, 7 Drawing Sheets

OTHER PUBLICATIONS

"IEEE Recommended Practice for Utility Interface of Photovoltaic (PV) Systems," IEEE Std 929-2000, Approved Jan. 30, 2000, Copyright 2000 IEEE.

Bower, Ward et al., "Performance Test Protocol for Evaluating Inverters Used in Grid-Connected Photovoltaic Systems," DRAFT Oct. 2004.

Esram, T. and Chapman, P.L. "Comparison of Photovoltaic Array Maximum Power Point Tracking Techniques," IEEE Trans. Energy Conversion, vol. 22, No. 2, Jun. 2007.

Bower, Ward Isaac, "The AC PV Building Block Ultimate Plug-n-Play That Brings Photovoltaics Directly to the Customer," U.S. Department of Energy Contract DE-AC04-94AL85000, published Feb. 1, 2003, pp. 1-4.

Bower, Ward I. et al., "Innovative Micro-Inverter for the AC PV Building Block or AC Modules," Copyright 2005 by ASME.

Jantsch, M. & Verhoeve, C. W. G. "AC PV Module Inverters With Full Sine Wave Burst Operation Mode for Improved Efficiency of Grid Connected Systems At Low Irradiance," downloaded from the Internet, ftp://ftp.ecn.nl/pub/www/library/conf/14epsec/burstmod.pdf on Jan. 28, 2009.

* cited by examiner

METHOD AND APPARATUS FOR IMPROVED BURST MODE DURING POWER CONVERSION

CROSS-REFERENCE TO RELATED APPLICATIONS

This application is a continuation of U.S. patent application Ser. No. 12/249,533, filed Oct. 10, 2008 now U.S. Pat. No. 7,768,155. The aforementioned related patent application is herein incorporated by reference in its entirety.

BACKGROUND OF THE INVENTION

1. Field of the Invention

Embodiments of the present disclosure generally relate to power conversion and, more particularly, to a method and apparatus for improved burst mode operation.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules have a nonlinear relationship between the current (I) and voltage (V) that they produce. A maximum power point (MPP) on an I-V curve for a PV module identifies the optimal operating point of the PV module; when operating at this point, the PV module generates the maximum possible output power for a given temperature and solar irradiance. Therefore, in order to optimize power drawn from a PV module, a power conversion device coupled to the PV module, such as an inverter or a micro-inverter, generally employs a maximum power point tracking (MPPT) technique to ensure that the PV module is operated at the current and voltage levels corresponding to its MPP. The MPPT acts to rapidly adjust the PV module operating current and voltage levels in response to changes in solar irradiance and/or temperature such that the PV module can continue to operate at the MPP.

During the time period required for an MPPT technique to bias a PV module to its MPP, for example, when the solar irradiance on a PV module changes from no irradiance to increasing irradiance or at a PV module/inverter initial activation, a power conversion device coupled to the PV module will suffer from a lower efficiency until the MPP is achieved. Additionally, a power conversion device coupled to a PV module generally will suffer from a lower efficiency when the PV module is operating at a low power, e.g., low irradiance. During low irradiance, a PV module and an associated inverter may operate so inefficiently that is it best for overall system efficiency to deactivate the PV module and/or its inverter until solar irradiance increases.

Therefore, there is a need in the art for a method and apparatus for improving operation of a PV module and inverter in achieving and tracking the maximum power point.

SUMMARY OF THE INVENTION

Embodiments of the present invention generally relate to a method and apparatus for coupling power to an AC power grid. In one embodiment, the method comprises interleaving a storage period and a burst period, wherein (i) energy is stored during the storage period for a predetermined number of grid voltage cycles, and (ii) stored energy is converted to AC power and coupled to the AC power grid during the burst period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
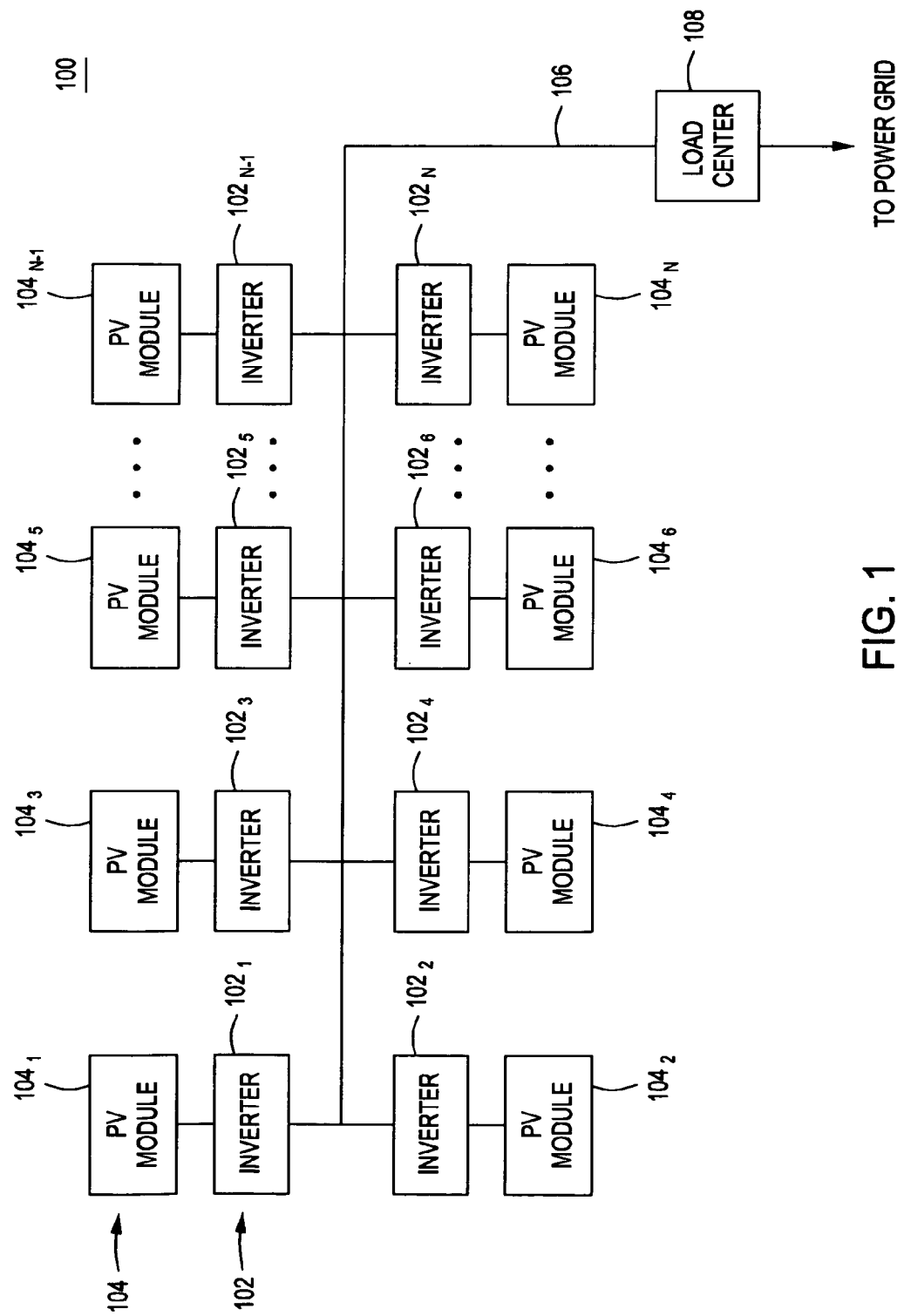
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104_n$, collectively referred to as PV modules 104, an AC bus 106, and a load center 108.

Each inverter $102_1$, $102_2$ ... $102_n$ is coupled to a PV module $104_1$, $104_2$ ... $104_n$, respectively. In some embodiments, a DC-DC converter may be coupled between each PV module 104 and each inverter 102 (e.g., one converter per PV module 104). Alternatively, multiple PV modules 104 may be coupled to a single inverter 102 (i.e., a centralized inverter); in some embodiments, a DC-DC converter may be coupled between the PV modules 104 and the centralized inverter.

Each inverter 102 employs an MPPT technique to operate the subtending PV module 104 at its MPP such that the PV module 104 generates an optimal power output for a given temperature and solar irradiation. The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

In accordance with one or more embodiments of the present invention, the inverters 102 employ a "burst mode" during initial operation. In burst mode, the inverters 102 store energy over one or more AC grid voltage cycles ("energy storage periods") and subsequently "burst" the stored energy to the commercial power grid ("burst periods"). The length of the energy storage periods is determined such that a ripple voltage overriding the PV module output voltage remains below a desired ripple voltage threshold.

In addition to improving the efficiency of the inverters 102, the burst mode facilitates a rapid convergence to the MPP utilizing an MPPT technique described below. Upon operating proximate the MPP, and if the PV modules 104 are supplying sufficient output power, the inverters 102 deactivate the burst mode and operate in a continuous mode, utilizing the MPPT technique to remain proximate to the MPP. In the event that the solar irradiance and/or temperature changes to a level such that the output power from the PV modules 104 drops below a burst mode threshold, one or more of the inverters 102 switch back to burst mode.

Figure 2:
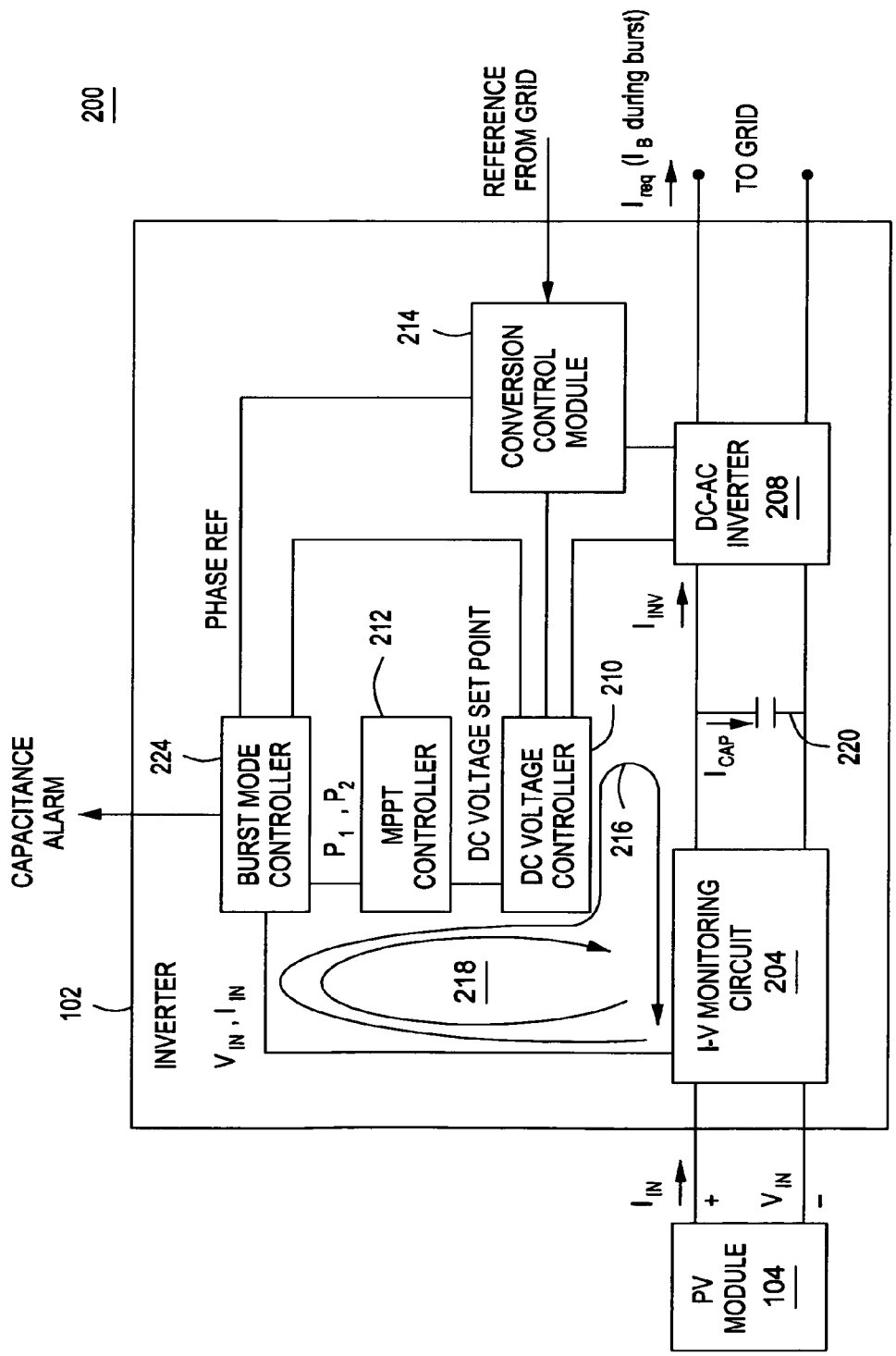
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 204, an input capacitor 220, a DC-AC inverter 208, a DC voltage controller 210, an MPPT controller 212, a burst mode controller 224, and a conversion control module 214. The inverter 102 is coupled to the PV module 104 and to the commercial power grid.

The I-V monitoring circuit 204 is coupled to the PV module 104, the input capacitor 220, and the burst mode controller 224. The burst mode controller 224 is further coupled to the DC voltage controller 210, the MPPT controller 212, and the conversion control module 214. Additionally, the MPPT controller 212 is coupled to the DC voltage controller 210, and the DC voltage controller 210 is coupled to the conversion control module 214. The DC voltage controller 210 functions to bias the PV module 104 at a DC voltage set point (i.e., a desired PV module operating voltage), while the MPPT controller 212 drives such DC voltage set point to correspond to the MPP voltage. The burst mode controller 224 functions to switch the inverter 102 between continuous mode and burst mode, and additionally measures input power from the PV module 104 that is utilized by the MPPT controller 212 in determining the DC voltage setpoint.

The I-V monitoring circuit 204 monitors the instantaneous input voltage and current, $V_{in}$ and $I_{in}$, respectively, from the PV module 104. The input capacitor 220, in addition to being coupled to the I-V monitoring circuit 204, is coupled to the DC-AC inverter 208, and the DC-AC inverter 208 is further coupled to the DC voltage controller 210, the conversion control module 214, and the commercial power grid. A current $I_{cap}$ flows through the input capacitor 220, and a current $I_{inv}$ flows to the DC-AC inverter 208.

The conversion control module 214 receives a reference signal from the commercial power grid, and provides the control signals for the DC-AC inverter 208 to convert the received DC current, $I_{inv}$, to a required AC output current, $I_{req}$. One example of such power conversion is commonly assigned U.S. Patent Application Publication Number 2007/0221267 entitled "Method and Apparatus for Converting Direct Current to Alternating Current" and filed Sep. 27, 2007, which is herein incorporated in its entirety by reference. The AC output current $I_{req}$ from the DC-AC inverter 208 is coupled to the commercial power grid such that it is in-phase with the commercial AC current.

The DC voltage controller 210 employs a first feedback loop (an "inner" loop) 216 to bias the PV module 104 at the DC voltage setpoint by modulating the current $I_{in}$ drawn from the PV module 104. The first feedback loop 216 comprises the I-V monitoring circuit 204, the burst mode controller 224, the MPPT controller 212, the DC voltage controller 210, and the DC-AC inverter 208. The DC voltage controller 210 receives a signal indicative of the PV module DC (i.e., average) input voltage $V_{DC}$ from the burst mode controller 224, and receives the DC voltage setpoint from the MPPT controller 212. Based on a difference between the $V_{DC}$ and the DC voltage setpoint, the first feedback loop 216 drives the DC-AC inverter 208 to generate $I_{req}$ such that the appropriate current $I_{in}$ is drawn from the PV module 104 to bias the PV module 104 at the DC voltage setpoint. Thus, the first feedback loop 216 iteratively computes a difference between the average PV module operating voltage and a DC voltage setpoint for the PV module 104, and accordingly adjusts the current $I_{in}$ drawn from the PV module 104 such that the PV module 104 is biased at the DC voltage setpoint (i.e., at an operating current and voltage that approximately corresponds to the MPP).

The MPPT controller 212 employs a second feedback loop 218 (an "outer" loop) to adjust the DC voltage setpoint such that it corresponds to the MPP voltage. The second feedback loop 218 comprises the I-V monitoring circuit 204, the burst mode controller 224, the MPPT controller 212, and the DC voltage controller 210. The burst mode controller 224 receives signals indicative of the instantaneous PV module input current and voltage, $I_{in}$ and $V_{in}$, respectively, through the I-V monitoring circuit 204, and computes the instantaneous input power, $P_{in}$, from the PV module 104. The burst mode controller 224 further processes the input power $P_{in}$, as described in greater detail below, to obtain a first and a second power measurement and provides such power measurements to the MPPT controller 212. The MPPT controller 212 determines a power difference between the first and second power measurements; based on the difference, the MPPT controller 212 determines whether the PV module operating voltage must be increased or decreased to reach the MPP, modifies the DC voltage setpoint accordingly, and supplies the new DC voltage setpoint to the DC voltage controller 210. Additionally, a power difference of zero indicates that the PV module 104 is currently biased at the MPP, and the MPPT controller 212 supplies the corresponding DC voltage setpoint to the DC voltage controller 210. The second feedback loop 218 thus iteratively determines whether the PV module 104 is operating proximate the MPP and, in the case where the PV module 104 is not operating proximate the MPP, modifies at least one operating parameter within the first feedback loop 216 to achieve the MPP (i.e., the outer loop "fine tunes" the setting established by the inner loop).

Upon initial operation or sufficiently low output power from the PV module 104, the burst mode controller 224 operates the inverter 102 in burst mode, wherein during energy storage periods (e.g., one or more AC grid voltage cycles of 16.67 msec), the input capacitor 220 stores energy that is subsequently supplied to the DC-AC inverter 208 during a burst period. During burst mode, the burst mode controller 224 drives the DC voltage controller 210 such that the output current generated by the inverter 102, $I_{req}$, is a "burst mode current", $I_B$. Once the PV module 104 is operating proximate the MPP voltage, and if the PV module 104 is generating sufficient output power (i.e., if the PV module output power is greater than a pre-determined burst mode threshold), the burst mode controller 224 operates the inverter 102 in continuous mode. If the PV module output power subsequently drops below the burst mode threshold, the burst mode controller 224 switches the inverter 102 back to burst mode operation.

During energy storage periods of burst mode operation, the DC-AC inverter 208 is driven such that no output current is generated by the inverter 102 (i.e., $I_B$ is zero). During such periods, current is precluded from flowing to the DC-AC inverter 208, thereby causing current generated by the PV module 104 to charge the input capacitor 220. The inverter 102 remains in an energy storage period for a number of AC grid voltage cycles, $N_{off}$, as determined by the burst mode controller 224, before beginning a burst period of one AC grid voltage cycle. During the burst period, the burst mode controller 224 causes the DC voltage controller 210 to drive the DC-AC inverter 208 such that the burst current $I_B$ is generated in accordance with the energy that has been stored in the input capacitor 220 during the previous energy storage period. As a result, the inverter output current during a burst period, $I_B$, is greater than the inverter output current during continuous mode, $I_{req}$, for a given level of solar irradiance and temperature. In some embodiments, $I_B=I_{req}*(N_{off}+1)$.

Due to the charging and discharging of the input capacitor 220 during burst mode, a ripple voltage ("burst mode ripple voltage", or $V_r$) overrides the average voltage across the input capacitor 220, and results in a corresponding burst mode ripple voltage overriding the PV module DC voltage, $V_{DC}$. As such, the PV module operating voltage fluctuates in accordance with the magnitude of the burst mode ripple voltage $V_r$; the greater the burst mode ripple voltage $V_r$, the greater the PV module operating voltage excursion. Such a fluctuation in the PV module operating voltage results in reduced efficiency of the inverter 102. For example, when operating proximate the MPP voltage, a larger voltage fluctuation around the MPP voltage results in a greater period of time that the PV module 104 is operating off of the MPP voltage, resulting in less than optimal power being drawn from the PV module 104.

The magnitude of the burst mode ripple voltage $V_r$ varies in accordance with the length of time the input capacitor 220 charges and discharges; i.e., with the energy storage and burst periods. The burst mode controller 224 controls the energy storage period, i.e., the number of AC grid voltage cycles of the energy storage period, $N_{off}$, such that the burst mode ripple voltage $V_r$ remains below a pre-determined threshold, thereby improving the efficiency of the inverter 102 during burst mode operation.

When operating in continuous mode, the inverter 102 continually generates output power in-phase with the AC grid power (i.e., during each AC grid voltage cycle). As such, the inverter output power oscillates between zero output power at the AC grid voltage zero-crossings and peak output power at the AC grid voltage peak positive and negative amplitudes. When the inverter output power is set at zero, current from the PV module 104 is precluded from flowing to the DC-AC inverter 208 and therefore charges the input capacitor 220. When the inverter output power is set at peak, energy stored in the input capacitor 220 is utilized, in addition to the instantaneous power from the PV module 104, to generate a peak inverter output power of twice the average PV module output power. Thus, the charging and discharging of the input capacitor 220 during continuous mode provides an AC component overriding the average power provided by the PV module 104.

During both the continuous and burst modes of operation, the ripple voltage caused by the charging and discharging of the input capacitor 220 provides an opportunity for maximum power point tracking. As the ripple voltage across the PV module 104 varies above and below an average (i.e., DC) PV module voltage, the PV module output power varies in accordance with the ripple voltage. If the PV module 104 produces more power when operating above its DC voltage than when operating below its DC voltage, then the PV module DC voltage is below the MPP and must be increased to reach the MPP. If the PV module 104 produces more power when operating below its DC voltage than when operating above its DC voltage, then the PV module DC voltage is above the MPP and must be decreased to reach the MPP. Thus, the difference between the average power produced by the PV module 104 when it is operating above its DC voltage and when it is operating below its DC voltage indicates in which direction the PV module DC voltage must be shifted to achieve the MPP. Additionally, if the difference is zero, the PV module 104 is biased at the MPP. In some embodiments, such a power difference may be determined based on the PV module output power during certain phases of the AC grid voltage, as further described below.

Figure 3:
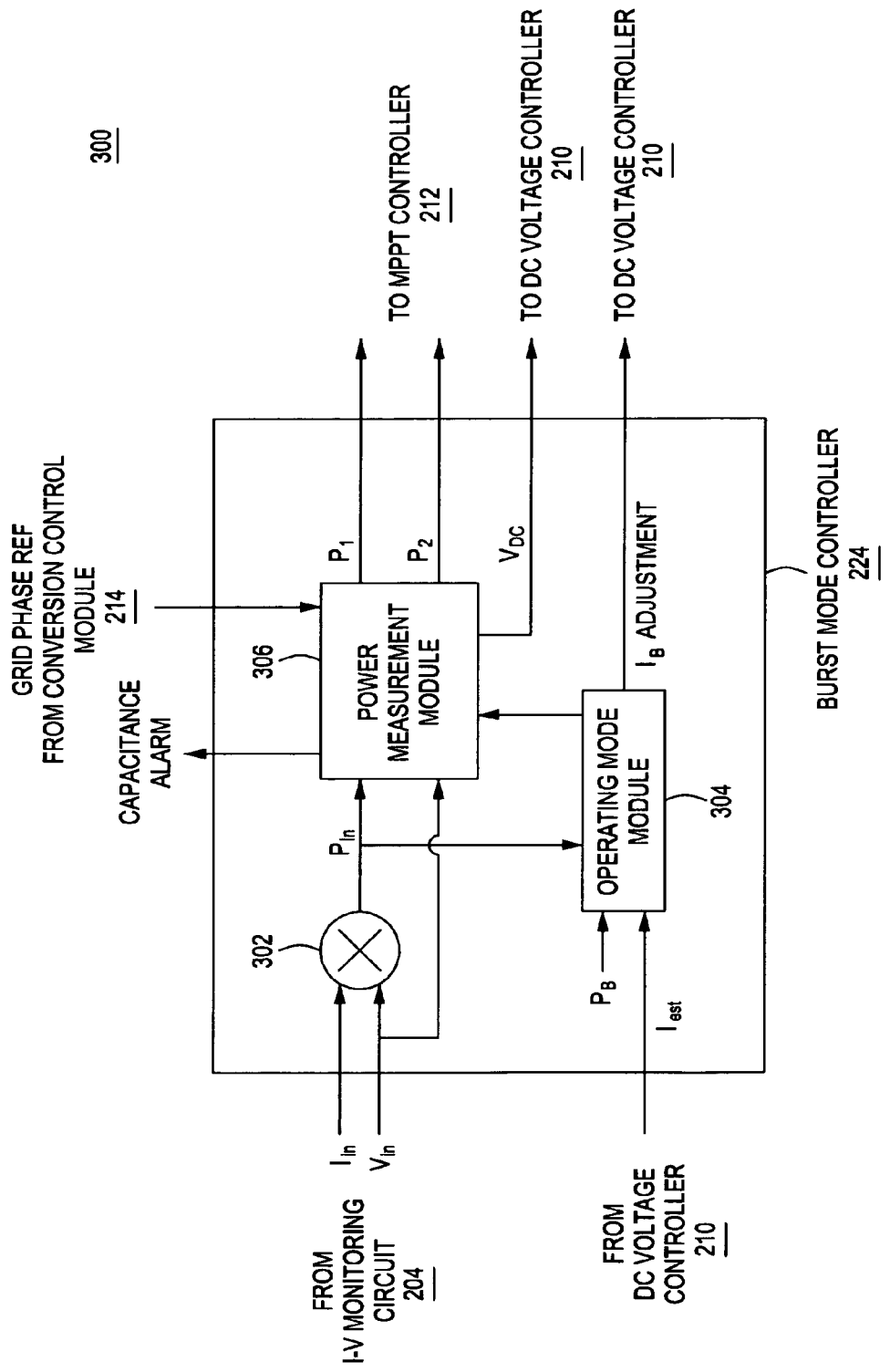
FIG. 3 is a block diagram of a burst mode controller in accordance with one or more embodiments of the present invention.

FIG. 3 is a block diagram of a burst mode controller 224 in accordance with one or more embodiments of the present invention. The burst mode controller 224 comprises a multiplier 302, an operating mode module 304, and a power measurement module 306.

The multiplier 302 receives signals indicative of the instantaneous input current and voltage from the PV module 104, $I_{in}$ and $V_{in}$, respectively, through the I-V monitoring circuit 204, and generates an output signal indicative of the instantaneous input power from PV module 104, $P_{in}$. The output of the multiplier 302 is coupled to the power measurement module 306 and to the operating mode module 304; additionally, the power measurement module 306 receives inputs of $I_{in}$ and $V_{in}$. The operating mode module 304 is further coupled to the DC voltage controller 210, and receives a signal indicative of an estimated PV module input current, $I_{est}$, from the DC voltage controller 210. The $I_{est}$ is an estimated input current to be drawn from the PV module 104 that will result in biasing the PV module 104 at a desired DC voltage setpoint. The operating mode module 304 is also coupled to the power measurement module 306, and additionally receives an input signal of a burst mode power threshold, $P_B$.

The operating mode module 304 compares the PV module input power $P_{in}$ to the burst mode threshold $P_B$. If the inverter 102 is operating in continuous mode and $P_{in}$ is less that $P_B$, the operating mode module 304 switches the inverter 102 to burst mode; once $P_{in}$ is greater than $P_B$, the operating mode module 304 switches the inverter 102 back to continuous mode.

The power measurement module 306 receives an input indicative of the AC grid voltage phase from the conversion control module 214, for example, from a phase lock loop of the conversion control module 214. The power measurement module 306 integrates the PV module input power $P_{in}$ during certain portions of the AC grid voltage cycle to obtain a first power "bin", $PB_1$, and a second power "bin", $PB_2$. Additionally, the PV module input voltage $V_{in}$ is integrated over a portion of the AC grid voltage cycle to obtain a DC voltage bin, $V_{DC}B$, where $V_{DC}B$ is utilized to determine a DC (i.e., average) PV module input voltage, $V_{DC}$. In some embodiments, during each cycle of the AC grid voltage when operating in continuous mode, the power measurement module 306 integrates $P_{in}$ during a 90°-180° phase of the AC grid voltage cycle to obtain $PB_1$, and integrates $P_{in}$ during a 180°-270° phase of the same AC grid voltage cycle to obtain $PB_2$. The PV module input voltage $V_{in}$ is integrated over the entire 90°-270° phase to obtain $V_{DC}B$. During burst mode, the power bins and the average PV module input voltage are determined as described further below.

The power measurement module 306 determines a first and a second power measurement, $P_1$ and $P_2$, respectively, based on $PB_1$ and $PB_2$. During continuous mode, $P_1=PB_1$, and $P_2=PB_2$; during burst mode, the power measurements are determined as described further below. The first and second power measurements are supplied to the MPPT controller 212 for determining whether the PV module 104 is operating at, above, or below the MPP, and any required shift in the DC voltage setpoint to achieve the MPP. Additionally, the power measurement module 306 determines a PV module DC voltage, $V_{DC}$, based on $V_{DC}B$. The power measurement module 306 supplies $V_{DC}$ to the DC voltage controller 210 for determining $I_{req}$. The new DC voltage setpoint and the required output current $I_{req}$ are applied during the next AC grid voltage cycle.

When switching from continuous to burst mode, the operating mode module 304 determines a maximum number of AC grid voltage cycles, $N_{off}$, for an energy storage period such that the burst mode ripple voltage $V_r$ will remain below a pre-determined threshold. In some embodiments, a threshold of 10% of the PV module DC voltage $V_{DC}$ is utilized. In some embodiments, $N_{off}$ is computed as follows:

$$Noff < C*Vdc*Vr/Pin*T$$

In the above equation, C is the capacitance of the input capacitor 220, $V_{DC}$ is the PV module DC voltage, $V_r$ is the burst mode ripple voltage, $P_{in}$ is the input power from the PV module 104, and T is the AC grid voltage cycle period.

During burst mode, the power measurement module 306 integrates the PV module input power $P_{in}$ over certain portions of the AC grid voltage cycle during an energy storage period to obtain $PB_1$ and $PB_2$. To determine the portions of the AC grid voltage cycle over which to integrate $P_{in}$, the $N_{off}$ AC grid cycles of the energy storage period are partitioned into two equal portions—a "first half" of the energy storage period and a "second half" of the energy storage period, where the first half occurs prior to the second half. For example, for an energy storage period of one AC grid voltage cycle, the first half comprises the AC grid voltage cycle from 0°-180°, and the second half comprises the same AC grid voltage cycle from 180°-360°. For an energy storage period of two AC grid voltage cycles, the first half comprises the entire first AC grid voltage cycle, and the second half comprises the entire second AC grid voltage cycle. For energy storage periods greater than two AC grid voltage cycles, the first and second halves are analogously defined.

To obtain $PB_1$, the power measurement module 306 integrates the PV module input power $P_{in}$ during any of the 90°-270° AC grid voltage phase periods occurring within the first half of the energy storage period. To obtain $PB_2$, the power measurement module 306 integrates the PV module input power $P_{in}$ during any of the 90°-270° AC grid voltage phase periods occurring within the second half of the energy storage period. Additionally, the power measurement module 306 integrates the PV module input voltage $V_{in}$ over each 90°-270° phase during the entire energy storage period, along with the 90°-270° phase during the subsequent burst period, to obtain $V_{DC}B$.

The measured power bins $PB_1$ and $PB_2$ are then used by the power measurement module 306 to determine the first and second power measurements, $P_1$ and $P_2$, respectively. In some embodiments, $P_1=PB_1/N_{off}$ and $P_2=PB_2/N_{off}$ during burst mode. Additionally, the power measurement module 306 determines $V_{DC}$ based on $V_{DC}B$. The first and second power measurements $P_1$ and $P_2$ are supplied to the MPPT controller 212 and $V_{DC}$ is supplied to the DC voltage controller 210 for the appropriate MPPT and inverter output current processing. The output of such processing, i.e., the new DC voltage setpoint and the required output current from the inverter 102, are applied to the burst period following the next energy storage period.

In some instances, the input capacitor 220 may degrade over time and degrade the performance of the inverter 102. In order to identify such a condition, the operation of the input capacitor 220 may be evaluated during burst mode when the number of AC grid voltage cycles in the energy storage period (i.e., $N_{off}$) is two or more. In some embodiments, the power measurement module 306 determines a difference between the average input voltage $V_{in}$ from the PV module 104 during the first and second AC grid voltage cycles of the energy storage period (i.e., $\Delta V$). The capacitance C of the input capacitor 220 can then be estimated as follows:

$$C = Iin/Fgrid*\Delta V$$

Where $I_{in}$ is the input current from the PV module 104, and $F_{grid}$ is the frequency of the grid voltage. If the capacitance is below a capacitance threshold, the power measurement module 306 may provide an output alarm to indicate the condition.

Figure 4:
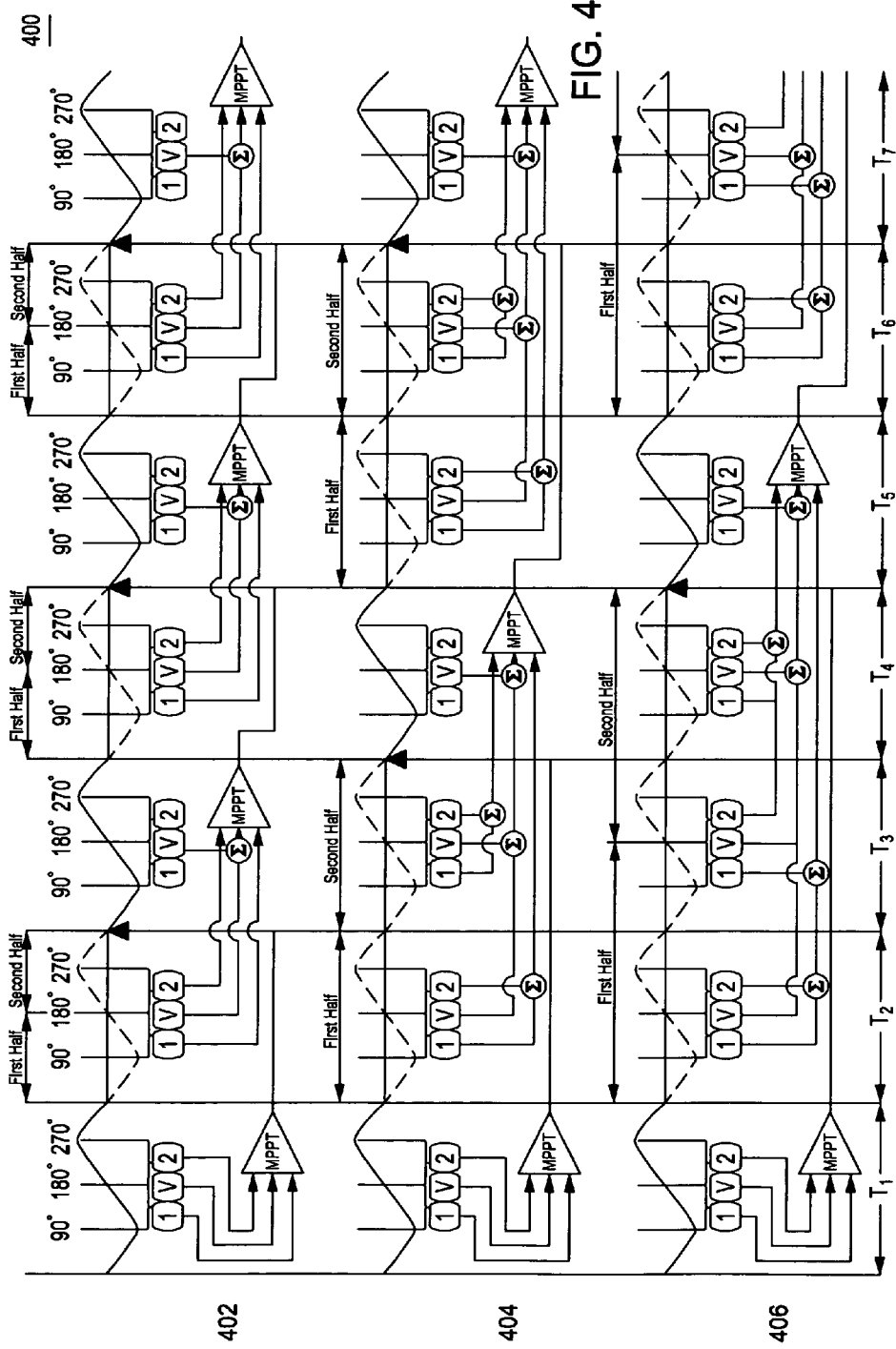
FIG. 4 is a plurality of waveforms depicting collection periods of PV module power and voltage measurements during burst mode in accordance with one or more embodiments of the present invention.

FIG. 4 is a plurality of waveforms 400 depicting collection periods of PV module power and voltage measurements during burst mode in accordance with one or more embodiments of the present invention.

The waveform 402 corresponds to a computed energy storage period of one AC grid voltage cycle. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $PB_1$, $PB_2$, and $V_{DC}$ are utilized to determine the inverter operating parameters for the next AC grid voltage cycle in which the inverter generates output power.

At the end of $T_1$, the inverter switches to burst mode and enters an energy storage period. The inverter generates no output power during such a period. The power bin $PB_1$ is obtained by integrating the PV module input power $P_{in}$ during the 90°-270° phase within the first half of the energy storage period (i.e., the 90°-180° phase of $T_2$), and the power bin $PB_2$ is obtained by integrating the PV module input power $P_{in}$ during the 90°-270° phase within the second half of the energy storage period (i.e., the 180°-270° phase of $T_2$). Additionally, the PV module input voltage $V_{in}$ is integrated during the entire 90°-270° period of $T_2$ and to obtain the voltage bin $V_{DC}B$.

At $T_3$, the inverter begins a burst period and begins generating output power. The operating parameters determined during $T_1$ are adjusted accordingly to drive the inverter to generate the burst mode current, $I_B$. During $T_3$, the PV module input voltage $V_{in}$ is integrated during the entire 90°-270° period of $T_3$ and added to the voltage bin $V_{DC}B$. $P_1$ is set to $PB_1$, and $P_2$ is set to $PB_2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_4$, the inverter begins an energy storage period. Analogous to the operation during $T_2$, $PB_1$, $PB_2$, and $V_{DC}B$ are obtained. At time $T_5$, the inverter begins a burst period. The operating parameters determined during $T_3$ are adjusted accordingly to drive the inverter to generate the burst mode current, $I_B$. Analogous to the operation during $T_3$, the PV module input voltage $V_{in}$ is integrated during the entire 90°-270° period of $T_5$ and added to the voltage bin $V_{DC}B$. $P_1$ is set to $PB_1$, and $P_2$ is set to $PB_2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

The waveform 404 corresponds to a computed energy storage period of two AC grid voltage cycles. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_2$, the inverter switches to burst mode and enters an energy storage period of two AC grid voltage cycles. The inverter generates no output power during such a period. The power bin $PB_1$ is obtained by integrating $P_{in}$ during the portions of the 90°-270° phases occurring within the first half of the energy storage period (i.e., the 90°-270° phase of $T_2$), and the power bin $PB_2$ is obtained by integrating $P_{in}$ during portions of the 90°-270° phases occurring within the second half of the energy storage period (i.e., the 90°-270° phase of $T_3$). Additionally, the PV module input voltage $V_{in}$ is integrated during each 90°-270° period of the energy storage period, i.e., the 90°-270° phase periods of $T_2$ and $T_3$ to obtain the voltage bin $V_{DC}B$.

At $T_4$, the inverter begins a burst period and begins generating output power. The operating parameters determined during $T_1$ are adjusted accordingly to drive the inverter to generate the burst mode current, $I_B$. During $T_4$, the PV module input voltage $V_{in}$ is integrated during the entire 90°-270° period of $T_4$ and added to the voltage bin $V_{DC}B$. $P_1$ is set to $PB_1/2$, $P_2$ is set to $PB_2/2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_5$, the inverter begins an energy storage period. Analogous to the operation during $T_2$ and $T_3$, $PB_1$, $PB_2$, and $V_{DC}B$ are obtained. At time $T_7$, the inverter begins a burst period. The operating parameters determined during $T_4$ are adjusted accordingly to drive the inverter to generate the burst mode current, $I_B$. Analogous to the operation during $T_2$ and $T_3$, the PV module input voltage $V_{in}$ is integrated during the entire 90°-270° period of $T_7$ and added to the voltage bin $V_{DC}B$. $P_1$ is set to $PB_1/2$, $P_2$ is set to $PB_2/2$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

The waveform 406 corresponds to a computed energy storage period of three AC grid voltage cycles. During a first AC grid voltage cycle $T_1$, an inverter is operating in continuous mode. The power bins $PB_1$ and $PB_2$ are obtained by integrating the PV module input power $P_{in}$ during the 90°-180° and 180°-270° phases of the AC grid voltage, respectively, and the PV module input voltage $V_{in}$ is integrated during the entire 90°-270° period to obtain the DC voltage bin $V_{DC}B$. $P_1$ is set to $PB_1$, $P_2$ is set to $PB_2$, and the average DC voltage $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

At $T_2$, the inverter switches to burst mode and enters an energy storage period of three AC grid voltage cycles. The inverter generates no output power during such a period. The power bin $PB_1$ is obtained by integrating $P_{in}$ during the portions of the 90°-270° phases occurring within the first half of the energy storage period (i.e., the 90°-270° phase of $T_2$ and the 90°-180° phase of $T_3$), and the power bin $PB_2$ is obtained by integrating $P_{in}$ during portions of the 90°-270° phases occurring within the second half of the energy storage period (i.e., the 180°-270° phase of $T_3$ and the 90°-270° phase of $T_4$). Additionally, the PV module input voltage $V_{in}$ is integrated during each 90°-270° period of the energy storage period, i.e., the 90°-270° phase periods of $T_2$, $T_3$, and $T_4$ to obtain the voltage bin $V_{DC}B$.

At $T_5$, the inverter begins a burst period and begins generating output power. The operating parameters determined during $T_1$ are adjusted accordingly to drive the inverter to generate the burst mode current, $I_B$. During $T_5$, the PV module input voltage $V_{in}$ is integrated during the entire 90°-270° phase and added to the voltage bin $V_{DC}B$. $P_1$ is set to $PB_1/3$, $P_2$ is set to $PB_2/3$, and $V_{DC}$ is computed from $V_{DC}B$. The power and voltage measurements $P_1$, $P_2$, and $V_{DC}$ are utilized to determine the inverter operating parameters for the next AC grid voltage cycle in which the inverter generates output power.

Figure 5:
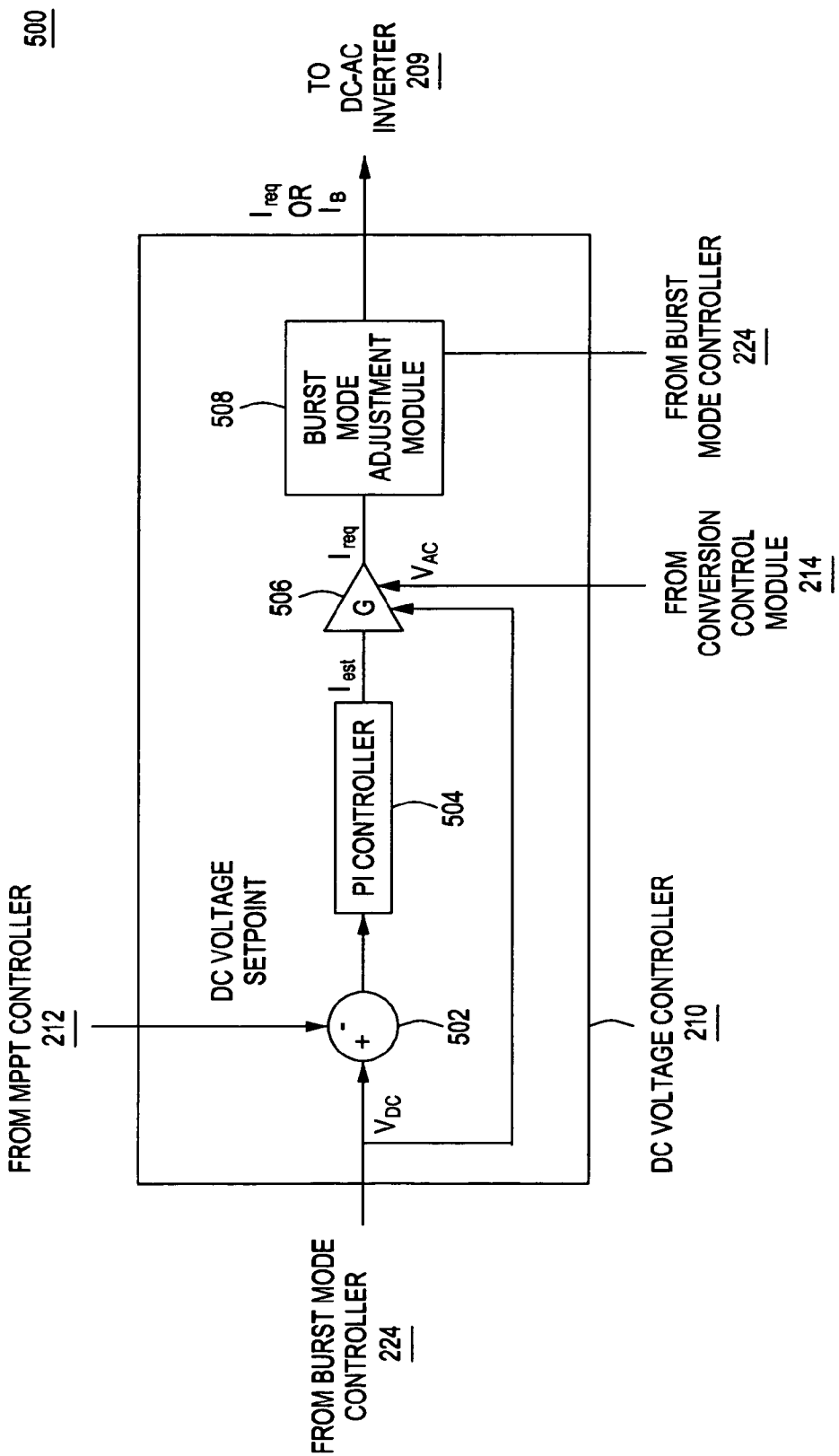
FIG. 5 is a block diagram of a DC voltage controller in accordance with one or more embodiments of the present invention.

FIG. 5 is a block diagram 500 of a DC voltage controller 210 in accordance with one or more embodiments of the present invention. The DC voltage controller 210 comprises an adder/subtractor 502, a proportional-integral (PI) controller 504, a gain module 506, and a burst mode adjustment module 508. The DC voltage controller 210 utilizes the first feedback loop 216 to control the current supplied to the DC-AC inverter 208 such that the PV module 104 is biased at the DC voltage setpoint.

The adder/subtractor 502 receives a signal indicative of the PV module DC voltage, $V_{DC}$, from the burst mode controller 224, and a signal indicative of the DC voltage setpoint from the MPPT controller 212. The output of the adder/subtractor 502 couples a difference between $V_{DC}$ and the DC voltage setpoint to the PI controller 504. The PI controller 504 acts to correct the difference by estimating an input current, $I_{est}$, to be drawn from the PV module 104 that will result in biasing the PV module 104 at the DC voltage setpoint.

The output of the PI controller 504 is coupled to the gain module 506 and provides a signal indicative of $I_{est}$ to the gain module 506. The gain module 506 further receives an input of the AC grid voltage amplitude, $V_{AC}$, from the conversion control module 214, and $V_{DC}$ from the burst mode controller 224, and determines the required output current from the inverter, $I_{req}$, to draw $I_{est}$ from the PV module 104. In some embodiments, $I_{req}$ is calculated as follows:

$$I_{req}=V_{DC}*I_{est}/V_{AC}*eff$$

In the above equation, eff is an efficiency rating of the inverter.

The output of the gain module 506 is coupled to the burst mode adjustment module 508. The burst mode adjustment module 508 adjusts the required inverter output current $I_{req}$ during burst mode such that it corresponds to the burst mode output current, $I_B$, in accordance with a control signal received from the burst mode controller 224. The output of the burst mode adjustment module 508 is coupled to the DC-AC inverter 208 and drives the DC-AC to generate an output current $I_{req}$ during continuous mode and an output current $I_B$ during burst mode.

Figure 6:
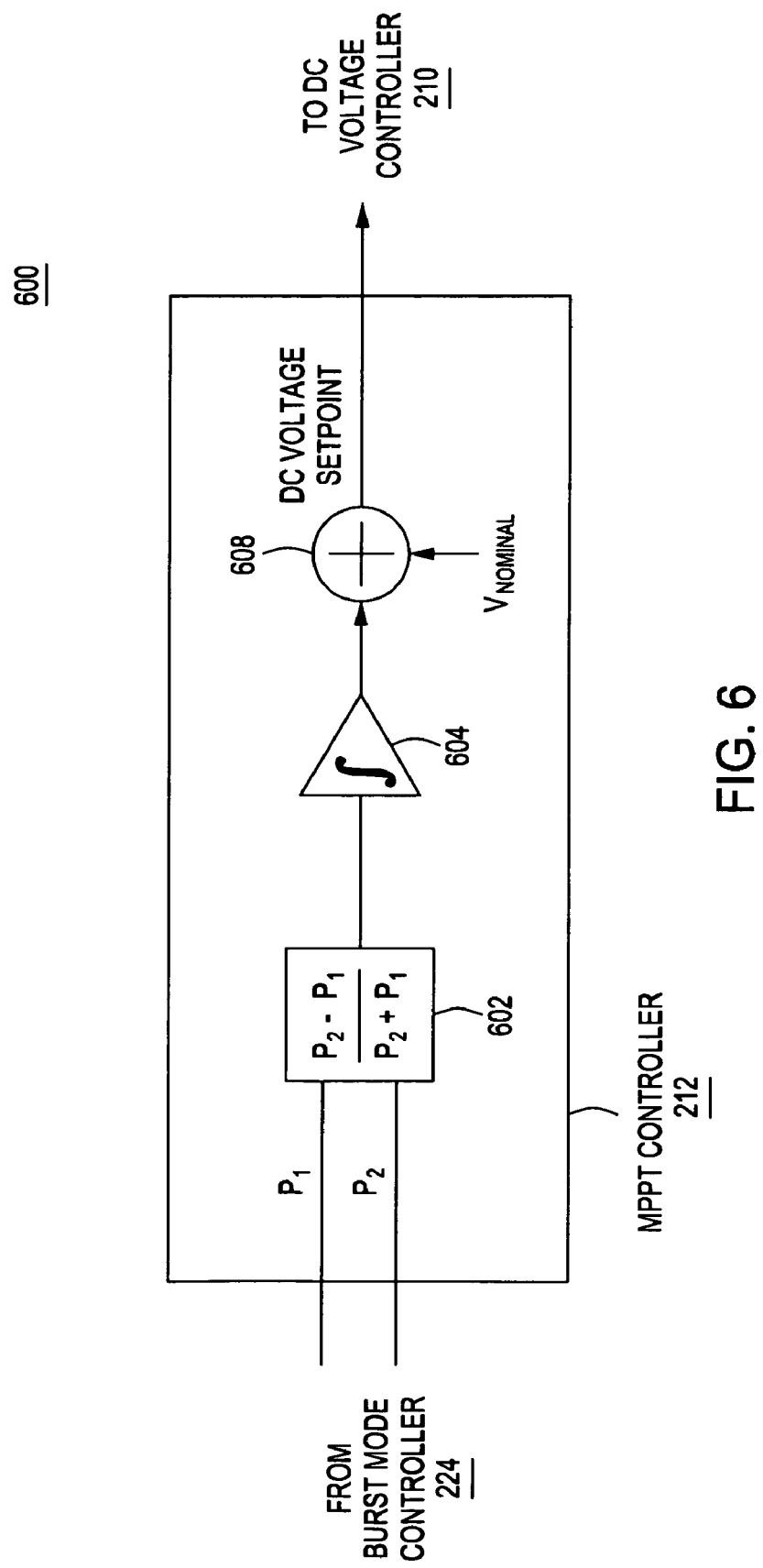
FIG. 6 is a block diagram of an MPPT controller in accordance with one or more embodiments of the present invention.

FIG. 6 is a block diagram of an MPPT controller 212 in accordance with one or more embodiments of the present invention. The MPPT controller 212 comprises a power difference module 602, an integrator 604, and an adder 608. The MPPT controller 212 utilizes the second feedback loop 218 to determine a DC voltage setpoint for the PV module 104 corresponding to the MPP voltage.

The power difference module 602 receives signals indicative of the first and second power measurements, $P_1$ and $P_2$, from the burst mode controller 224. The power difference module 602 computes a power difference between $P_1$ and $P_2$ and utilizes the power difference to determine an error signal, $\epsilon$. In some embodiments, the power difference is computed as $(P_2-P_1)/(P_2+P_1)$.

The error signal $\epsilon$ from the power difference module 602 is coupled to the integrator 604. The integrator 604 integrates the error signal $\epsilon$ and couples the integrated error signal to the adder 608. The adder 608 additionally receives an input of a nominal voltage, $V_{nom}$, where $V_{nom}$ is an initial estimate of the MPP voltage. The integrated error signal acts to "fine tune" the nominal voltage such that the DC voltage setpoint (i.e., the sum of the integrated error and the nominal voltage) corresponds to the MPP voltage. The DC voltage setpoint is then supplied to the DC voltage controller 210 in order to drive the PV module 104 to operate at the DC voltage setpoint.

Figure 7:
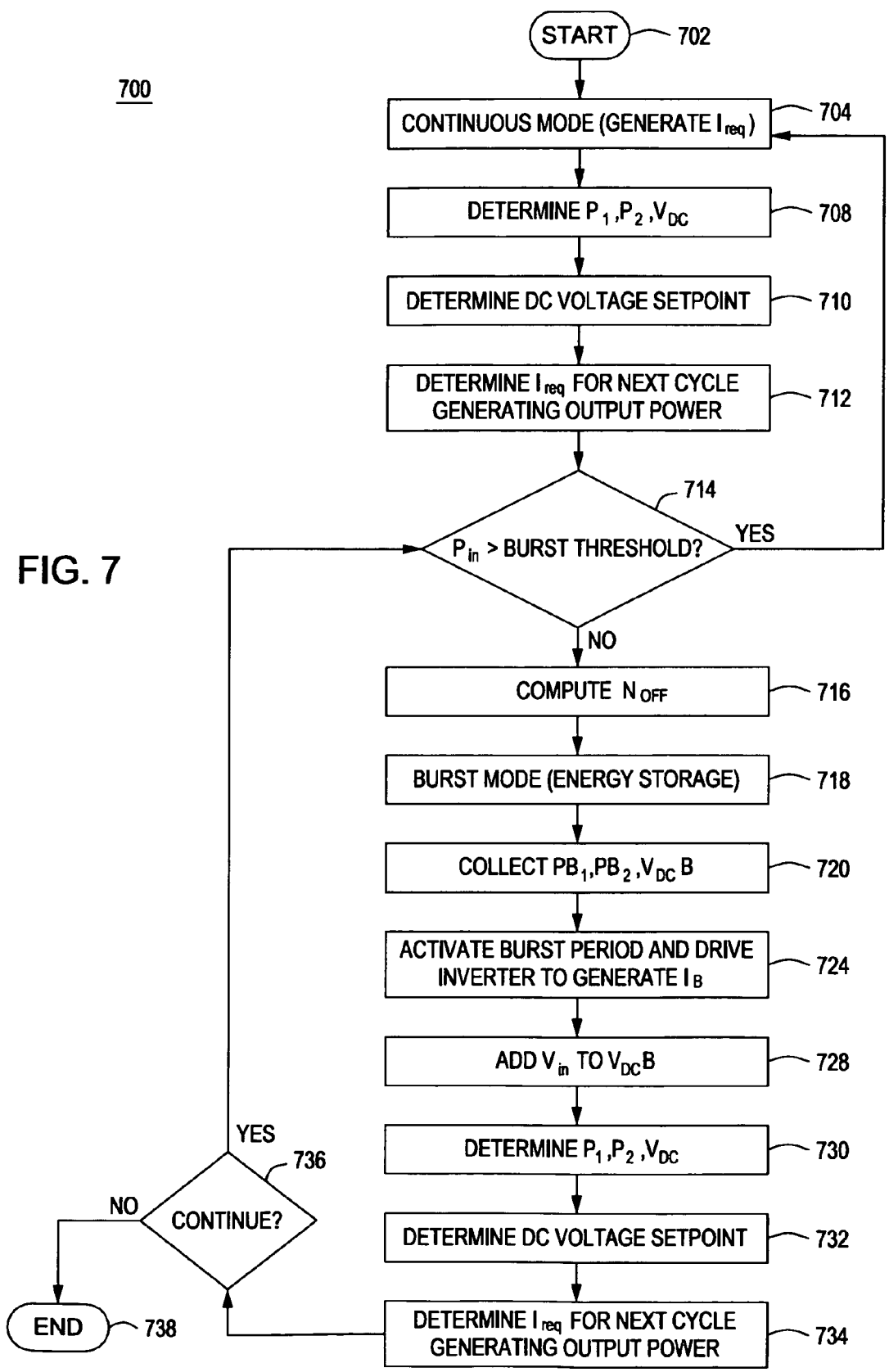
FIG. 7 is a flow diagram of a method for operating an inverter in burst mode in accordance with one or more embodiments of the present invention.

FIG. 7 is a flow diagram of a method 700 for operating an inverter in burst mode in accordance with one or more embodiments of the present invention. In some embodiments, such as the embodiment described below, a power conversion device, such as a DC-AC inverter, is coupled to the PV module and converts DC power from the PV module to AC power, where such AC power is coupled to a commercial power grid. In some embodiments, multiple PV modules may be coupled to a single centralized DC-AC inverter; alternatively, individual PV modules may be coupled to individual DC-AC inverters (e.g., one PV module per DC-AC inverter). In some embodiments, a DC-DC converter may be coupled between the PV module or PV modules and the DC-AC inverter.

The method 700 begins at step 702 and proceeds to step 704. At step 704, the inverter operates in continuous mode and generates an output current, $I_{req}$, such that the PV module is biased proximate the MPP voltage. At step 708, a first and a second power measurement of the input power from the PV module, $P_1$ and $P_2$, respectively, are obtained. In some embodiments, the first power measurement comprises integrating the input power $P_{in}$ from the PV module during a 90°-180° phase of an AC grid waveform cycle to obtain a first "power bin", $PB_1$, where $P_1=PB_1$, and the second power measurement comprises integrating $P_{in}$ during the 180°-270° phase of the same AC grid waveform cycle to obtain a second "power bin", $PB_2$, where $P_2=PB_2$. In some embodiments, $P_{in}$ may be sampled during such phases to obtain the first and second power measurements; for example, $P_{in}$ may be sampled at a rate of 256 times the commercial power grid frequency. In alternative embodiments, the first and second power measurements may be obtained during different phases of an AC grid waveform cycle.

Additionally, an average, or DC, voltage from the PV module, $V_{DC}$, is computed. In some embodiments, the voltage $V_{in}$ from the PV module is integrated during the 90°-270° phase of the AC grid voltage to obtain a DC voltage "bin", $V_{DC}B$. $V_{DC}$ is then computed based on $V_{DC}B$.

The method 700 proceeds to step 710, where $P_1$, $P_2$ and $V_{DC}$ are utilized to determine a DC voltage setpoint for the PV module such that the DC voltage setpoint corresponds to the MPP voltage. At step 712, a required inverter output current, $I_{req}$, that will result in the PV module being biased at the desired DC voltage setpoint is determined. Steps 704 through 712 of the method 700 comprise an outer feedback loop that determines whether the PV module is currently biased at the MPP voltage, and, if necessary, adjusts the DC voltage setpoint to achieve the MPP.

The method 700 proceeds to step 714, where a determination is made whether the PV module input power exceeds a burst mode threshold. If the condition at step 714 is met, the method 700 returns to step 704 and the inverter continues to operate in continuous mode. If the condition at step 714 is not met, the method 700 proceeds to step 716.

At step 716, a maximum number of AC grid voltage cycles, $N_{off}$ for energy storage periods is determined based on a burst mode ripple voltage threshold. In some embodiments, a burst mode ripple voltage threshold of 10% of the PV module DC voltage $V_{DC}$ is utilized. At step 718, the inverter switches to burst mode, and begins an energy storage period of $N_{off}$ AC voltage grid cycles. During the energy storage period, the inverter does not produce any output power, and power generated by the PV module is stored in the inverter.

At step 720, the first and second power bins, $PB_1$ and $PB_2$, are collected, along with the DC voltage bin, $V_{DC}B$. In some embodiments, the $N_{off}$ AC grid cycles are partitioned into two equal portions—a "first half" of the $N_{off}$ AC voltage grid cycles and a "second half" of the $N_{off}$ AC voltage grid cycles, where the first half occurs prior to the second half. $PB_1$ is obtained by integrating the PV module input power $P_{in}$ during any of the 90°-270° AC grid voltage phase periods occurring within the first half, and $PB_2$ is obtained by integrating the PV module input power $P_{in}$ during any of the 90°-270° AC grid voltage phase periods occurring within the second half. Additionally, the PV module input voltage $V_{in}$ over each 90°-270° phase during the energy storage period to obtain $V_{DC}B$.

The method 700 proceeds to step 724. At step 724, following the energy storage period, a burst period is activated and the inverter begins to generate output power. In some embodiments, the burst period comprises a single AC grid voltage cycle. During the burst period, the required output current $I_{req}$ determined in step 712 is adjusted such that the inverter generates a burst current, $I_B$, in accordance with the amount of energy stored during the energy storage period. In some embodiments, $I_B=I_{req}*(N_{off}+1)$.

At step 728, an input voltage from the PV module is measured and added to the DC voltage bin $V_{DC}B$; in some embodiments, the PV module input voltage Vin is integrated over the 90°-270° phase of the AC grid voltage cycle and added to $V_{DC}B$. The method proceeds to step 730, where $P_1$, $P_2$, and $V_{DC}$ are determined. In some embodiments, $P_1=PB_1/N_{off}$, $P_2=PB_2/N_{off}$, and $V_{DC}$ is the average of $V_{DC}B$. At step 732, the DC voltage setpoint for the PV module is determined based on $P_1$, $P_2$, and $V_{DC}$. At step 734, the required inverter output current, $I_{req}$, that will result in the PV module being biased at the desired DC voltage setpoint is determined.

The method 700 proceeds to step 736, where a determination is made whether operation of the inverter should continue. If the condition at step 736 is met, the method 700 returns to step 714; if the conditions at step 736 is not met, the method 700 proceeds to step 738 where it ends.

While the foregoing is directed to embodiments of the present invention, other and further embodiments of the invention may be devised without departing from the basic scope thereof, and the scope thereof is determined by the claims that follow.

The invention claimed is:

1. A method for coupling power to an AC power grid, comprising:
    interleaving a storage period and a burst period, wherein (i) energy is stored during the storage period for a predetermined number of grid voltage cycles, and (ii) stored energy is converted to AC power and coupled to the AC power grid during the burst period.

2. The method of claim 1, wherein the predetermined number of the grid voltage cycles is determined prior to the storage period such that a ripple voltage across a device storing the energy satisfies a voltage threshold.

3. The method of claim 1, further comprising:
    generating a first power measurement and a second power measurement;
    computing a power difference based on a difference between the first and the second power measurements; and
    monitoring, based on the power difference, a maximum power point (MPP) of a power source providing power.

4. The method of claim 3, wherein the first power measurement is based on binning the power during a first period and the second power measurement is based on binning the power during a second period.

5. The method of claim 4, wherein the first period is a first portion of the storage period and the second period is a second portion of the storage period.

6. The method of claim 1, further comprising converting DC power received during the burst period to generate the AC power.

7. The method of claim 1, wherein the energy is stored during the storage period when power from a power source is less than optimal for continually coupling power to the AC power grid.

8. The method of claim 7, wherein the power is less than optimal when the power satisfies a power threshold.

9. The method of claim 1, wherein the predetermined number of the grid voltage cycles in the storage period is greater than one and the burst period is one grid voltage cycle.

10. The method of claim 2, wherein the predetermined number of the grid voltage cycles is less than $C*Vdc*Vr/Pin$, where C is a capacitance of the device, Vdc is an average voltage across a power source, Vr is a magnitude of the ripple voltage, and Pin is an input power from the power source.

11. An apparatus for coupling power to an AC power grid, comprising:
    a capacitor for storing energy during a storage period of at least one grid voltage cycle of the AC power grid;
    a burst mode controller coupled to the capacitor for controlling energy flow to and from the capacitor, wherein the burst mode controller computes a number of the grid voltage cycles in the storage period prior to the storage period; and
    a DC-AC converter coupled to the capacitor for converting stored energy to AC power and coupling the AC power to the AC power grid during a burst period.

12. The apparatus of claim 11, wherein the burst mode controller computes the number of the grid voltage cycles such that a ripple voltage across the capacitor satisfies a voltage threshold.

13. The apparatus of claim 11, wherein the burst mode controller generates a first power measurement and a second power measurement, and wherein a power difference based on a difference between the first and the second power measurements is utilized for monitoring a maximum power point (MPP) of a power source providing power.

14. The apparatus of claim 13, wherein the first power measurement is based on binning the power during a first period and the second power measurement is based on binning the power during a second period.

15. The apparatus of claim 14, wherein the first period is a first portion of the storage period and the second period is a second portion of the storage period.

16. The apparatus of claim 11, wherein the DC-AC converter further converts DC power received during the burst period to generate the AC power.

17. The apparatus of claim 11, wherein the burst mode controller causes the energy to be stored when power from a power source is less than optimal for continually coupling power to the AC power grid.

18. The apparatus of claim 11, wherein the number of the grid voltage cycles in the storage period is greater than one and the burst period is one grid voltage cycle.

19. The apparatus of claim 12, wherein the number of the grid voltage cycles is less than $C*Vdc*Vr/Pin$, where C is a capacitance of the capacitor, Vdc is an average voltage across a power source, Vr is a magnitude of the ripple voltage, and Pin is an input power from the power source.

20. A system for coupling power to an AC power grid, comprising:
    a photovoltaic (PV) module; and
    an inverter coupled to the PV module, wherein the inverter comprises:
    a capacitor for storing energy from the PV module during a storage period of at least one grid voltage cycle of the AC power grid;
    a burst mode controller coupled to the capacitor for controlling energy flow to and from the capacitor, wherein the burst mode controller computes, prior to the storage period, a number of the grid voltage cycles in the storage period such that a ripple voltage across the capacitor satisfies a voltage threshold; and
    a DC-AC converter coupled to the capacitor for converting stored energy to AC power and coupling the AC power to the power grid.

* * * * *